United States Patent
Sachs et al.

(10) Patent No.: US 9,477,645 B2
(45) Date of Patent: Oct. 25, 2016

(54) SYSTEMS AND METHODS OF ACTIVE TEXT MARKUP

(71) Applicants: Marco Sachs, St. Leon-Rot (DE); Andre Stern, Ladenburg (DE)

(72) Inventors: Marco Sachs, St. Leon-Rot (DE); Andre Stern, Ladenburg (DE)

(73) Assignee: SAP SE, Walldorf (DE)

( * ) Notice: Subject to any disclaimer, the term of this patent is extended or adjusted under 35 U.S.C. 154(b) by 497 days.

(21) Appl. No.: 13/799,481

(22) Filed: Mar. 13, 2013

(65) Prior Publication Data
US 2014/0281880 A1   Sep. 18, 2014

(51) Int. Cl.
*G06F 17/00* (2006.01)
*G06F 17/21* (2006.01)

(52) U.S. Cl.
CPC .................................. *G06F 17/218* (2013.01)

(58) Field of Classification Search
CPC .............................. G06F 17/241; G06F 17/24
USPC ................. 715/236, 255–256, 275, 232, 200
See application file for complete search history.

(56) References Cited

U.S. PATENT DOCUMENTS

| | | | |
|---|---|---|---|
| 5,946,647 A * | 8/1999 | Miller et al. ....................... 704/9 |
| 6,101,503 A | 8/2000 | Cooper et al. |
| 6,886,133 B2 * | 4/2005 | Bailey ................... G06F 17/211 707/999.004 |
| 6,968,332 B1 | 11/2005 | Milic-Frayling et al. |
| 7,003,522 B1 * | 2/2006 | Reynar ............. G06F 17/30896 707/736 |
| 7,127,473 B2 | 10/2006 | Agassi et al. |
| 7,137,076 B2 | 11/2006 | Iwema et al. |
| 7,262,772 B2 | 8/2007 | Ebert |
| 7,698,259 B2 | 4/2010 | Xue |
| 7,739,588 B2 * | 6/2010 | Reynar ................. G06F 17/218 715/234 |
| 7,770,102 B1 * | 8/2010 | Wolff .................. G06F 17/2785 715/234 |
| 8,131,755 B2 | 3/2012 | Kadayam et al. |
| 8,316,039 B2 | 11/2012 | Vanderwende et al. |
| 8,407,619 B2 | 3/2013 | Ordody et al. |
| 8,438,489 B2 | 5/2013 | Barthelmess et al. |
| 8,595,635 B2 | 11/2013 | Krzanowski et al. |
| 8,650,194 B2 | 2/2014 | Hu |
| 8,698,765 B1 | 4/2014 | Keller |
| 2005/0251737 A1 * | 11/2005 | Kobayashi .............. G06F 17/24 715/234 |
| 2007/0233692 A1 | 10/2007 | Lisa et al. |
| 2009/0019356 A1 * | 1/2009 | Deyab ................. G06F 17/2785 715/231 |
| 2009/0217254 A1 * | 8/2009 | Shneerson ............ G06F 17/218 717/168 |
| 2011/0119577 A1 * | 5/2011 | Audant ................. G06F 17/274 715/256 |
| 2012/0127082 A1 * | 5/2012 | Kushler et al. ............... 345/169 |
| 2014/0053069 A1 | 2/2014 | Yan |

* cited by examiner

*Primary Examiner* — Manglesh M Patel
(74) *Attorney, Agent, or Firm* — Schwegman Lundberg & Woessner, P.A.

(57) ABSTRACT

The present subject matter relates to text viewing and markup, and in particular to systems and methods of active text markup. In particular, various embodiments include at least one of systems, methods, and software to define text markup styles including associated actions to be performed against text marked up according to a defined markup style. Some embodiments include receiving marker input mapping a first markup style to an action and receiving text marker input associating the marker to a portion of document text. Such embodiments may further include receiving an action trigger to perform the action mapped to the marker associated to the portion of document text and performing the action based on the associated portion of document text.

25 Claims, 4 Drawing Sheets

SYSTEMS AND METHODS OF ACTIVE TEXT MARKUP

BACKGROUND INFORMATION

When reading text on a computing device, users often times make notes, markup text, highlight words or larger portions of text, and the like. Such actions are generally referred to as markups. With few exceptions such as change tracking in word processing programs, markups made today via a computing device are essentially the same as they have been since people started marking up physically printed text. For example, a user may markup a document with edits and comments and the edits and comments are later reviewed by the same or another user that may accepts or rejects changes and appropriately handles any comments. Another example is highlighting of text, which may further include adding comments or notes to the highlighted portions. However, in such examples of markups, the marked up text remains static and for action to be taken with regard to the markups, a user must take the particular action, which includes reviewing the markups manually and manually performing the particular action.

DETAILED DESCRIPTION

Textual documents can take many different forms. Such forms may include word processing documents, page description language documents (i.e., Portable Document Format or PDF), email, presentation files (i.e., Microsoft® PowerPoint® files), spreadsheets, and the like. Such documents may be read and reviewed for various purposes. Often times, a user may choose to markup a document for various reasons, such as to identify certain document portions as relevant to particular tasks, for follow up, to inquire further, to associate text with particular products that might meet a certain purpose or requirement specified in the text, and other reasons. Conventionally, such markups are later returned to and the reviewing user or another user takes action with regard to the markups. Various embodiments illustrated and described herein provide a markup tool that allows a user to define one or more markup styles and to associate one or more actions therewith. The one or more markup styles are then available within a markup tool to markup a textual document under review. Then, from markups applied to a textual document, the one or more actions associated with markup styles used in marking up the textual document can be triggered and performed. Performance of the actions may be automatic or semi-automatic (i.e., performed in part automatically and requesting further user input, such as in scheduling a meeting or generating an email based at least in part on text marked up in the textual document).

An action associated with a markup style may generally include a data processing activity that is to be performed with regard to text of a marked up portion of a textual document. One such action may be a query of an Internet search engine or a database. The markup in such an embodiment may be defined as a highlighter color associated with an action "SEARCH" and further associated with a Universal Resource Locator (URL) of a particular Internet search engine. In a database query embodiment, rather than an association with an Internet search engine, the association may instead be with a particular database, a stored procedure of a database, a web service or other service that can be called to query a database, and the like.

As stated above, however, a query is but just one action-type that may be associated with a markup style. Other examples may include a set of markup styles where each markup style is associated with a particular product. Subsequent markup of a textual document, such as a requirements document or a request for proposal document, the marked up portions of text may be extracted from the textual document into a new document or other repository and organized according to the markups. For example, a new document may be generated that includes a section for each of a number of products associated with respective defined markup styles. Each section of the new document may be created to include a heading representative of the respective product and each section may be populated with text from the textual document marked up in the markup style associated with the respective product. In another embodiment, rather than the markup styles being associated with products, the markup styles may instead be associated with chapter numbers, user-defined subjects or titles, or other user-defined sections. Similarly, the respective marked up text, upon triggering of markup actions with regard to the textual document, will be copied into a new document and organized according to the defined markups. In some embodiments, the new document, rather than being a textual document, may instead be one or more database records that will be created in a database and populated with the text of respective markups. In these and similar embodiments, as a user reviews and markups a textual document, the user is defining a new organization for select content of the textual document that can be automatically realized through triggering of the actions associated with the defined markup styles.

In yet another embodiment, a user may define markup styles with regard to various portions of a particular document type, such as an email or a meeting invitation. For example, markup styles may be defined for each of one or more of "TO" blocks (i.e. "TO", "CC", "BCC" fields of an email or meeting invite of a calendaring program or functionality of a groupware application/system), a subject line, a date and time, and a body. Following a user marking up a textual document and triggering the actions associated with the defined markup styles, an email or invite can be automatically generated. The email or invite may then be automatically sent, saved as a draft, or presented to the user prior to sending.

These embodiments and others are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
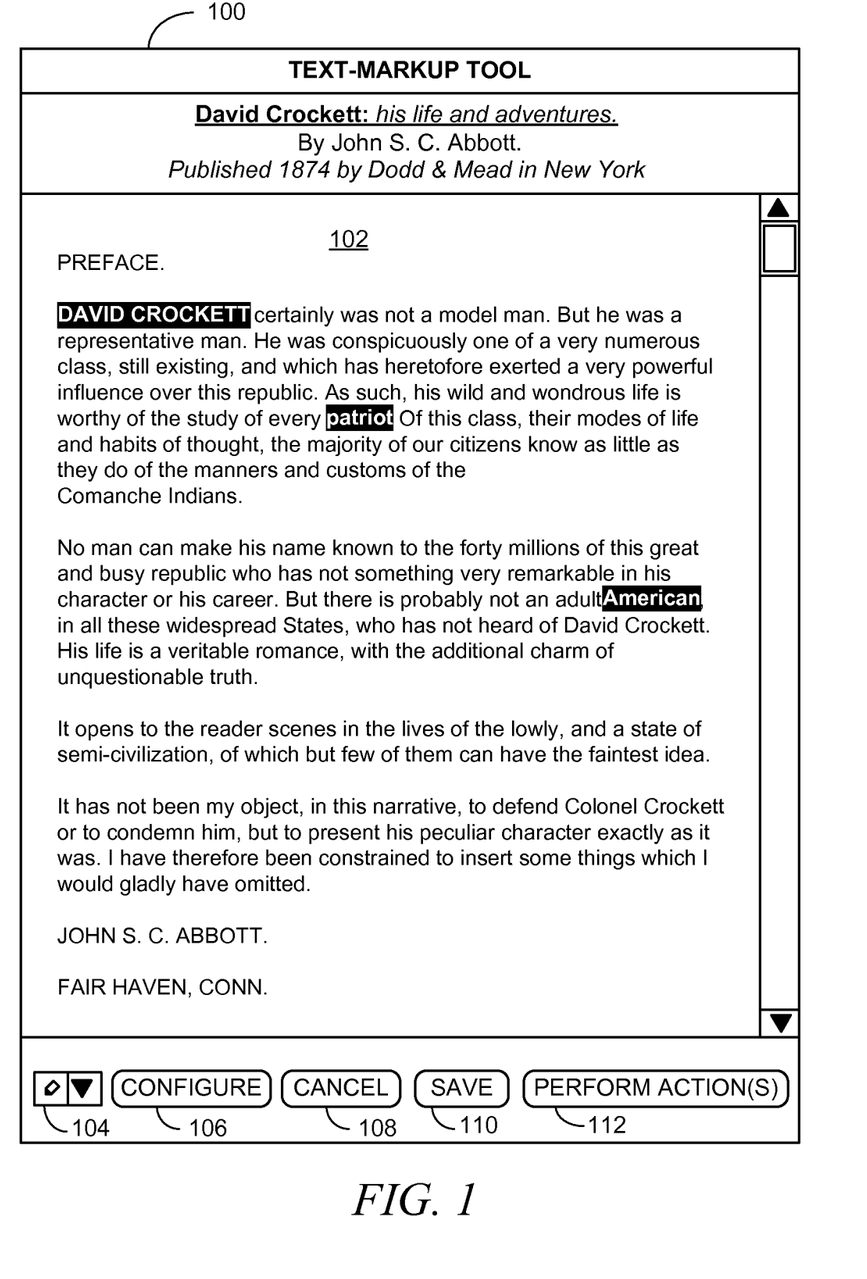
FIG. 1 is a user interface illustration, according to an example embodiment.

FIG. 1 is a user interface 100 illustration, according to an example embodiment. The user interface 100 is an example of a user interface within which a document may be viewed and markups may be added. The user interface 100 may be a user interface of any number of software applications that may organically include or be augmented with an application plugin to include text markup functionality as illustrated and described herein. For example, the user interface 100 may be a user interface of various application types, such word processing, spreadsheet, presentation, web browser, email, page description language, and other such applications that include textual document presentation functionality. Thus, as there are many different applications and application types with which the present disclosure is relevant, the user interface 100 is provided only as an example of how such functionality may be implemented and is not intended to limit in any way as to how the functionality can be implemented.

The user interface 100, among other portions, includes a textual presentation area 102. The textual presentation area 102 is an area within which text of document is presented and within which markups are made to the text. The markups to the text are added by a user through use of a markup tool 104 as manipulated by way of one or more input devices (i.e., touchscreen, mouse, touchpad, keyboard, etcetera). In some embodiments, the markup tool 104 may be triggered via an input device upon receipt of gesture input, such as a motion, tapping, clicking, or combination thereof as detected by a touchscreen or touchpad. Selection of the markup tool 104 activates markup tool 104 functionality to markup text of the textual document. As illustrated, the markup tool 104 is a dropdown. Selecting the markup tool 104 to view the dropdown options causes different defined markup styles to be presented. Selection of one such option activates the markup tool 104 according to the selected defined markup style. To define, delete, modify, or just to review the defined markup styles, the CONFIGURE button 106 can be selected. Selection of the CONFIGURE button 106 causes a markup style configuration user interface to be presented, an example of which is illustrated and described with regard to FIG. 2.

As illustrated, the markup style applied to the textual document presented within the textual presentation area 102 is highlighting of text. Note however, that in other embodiments, a markup style need not be limited only to highlighting of text. Instead, a markup style may be defined with regard to other properties of text, such as being one or more of bold, italic, a particular color, a different font, a different font size, underlined, double underlined, single or double strikethrough, all capital letters, small capital letters, or relevant combinations thereof. A markup style may be added by a user by selection of an appropriate markup definition through manipulation of the markup tool 104 and selecting document text. Similarly, the text may instead be selected first, followed by selection of the appropriate markup definition through manipulation of the markup tool 104.

As a user markups up a textual document presented within the textual presentation area 102, the user may select various action buttons 106, 108, 110, 112 or menu items (not illustrated) to cause various data processing activities to be performed. Most simply, a user may wish to discard any markups added to the presented document. In such an instance, the CANCEL button 108 may be selected and all previously unsaved markups added or removed by the user in the current session will be discarded.

However, if the user desires to save markup additions and removals as presented within the textual presentation area 102, the user may select the SAVE button 110. Selection of the SAVE button 110 causes data representative of all markups as presented within the document presentation area 102 to be stored.

The markups may be stored in various ways, depending on the particular embodiment and depending on the type of document to which the markups are added. For example, the markups maybe added within data of the document in instances where the document is stored in a markup language format (i.e., Hypertext Markup Language (HTML), eXtensible Markup Language (XML)). Such embodiments may generate a header object within the markup language document defining one or more markup styles and actions associated therewith. The markup language document in such embodiments will further include custom tags (i.e., <custom_tag_1> . . . <custom_tag_1/>) associated with each defined markup style denoting the markups in association with text of the document. In other embodiments, data defining markup styles and marking of document text is performed in a document file-type specific manner and is stored within the document file or in another file or data storage location from which the markup data is retrievable. In some embodiments however, the markup styles may be defined separately and associated with the document data within data of the document itself or in data stored separately from the document in storage location from which markup style data is retrievable, such as from a file, database, or web service providing such data. In yet another embodiment, a document viewing or authoring application, or an application plugin augmenting functionality of such an application, may include markup styles defined therein that are utilized in marking up documents. Thus, in some embodiments, the document, defined markup styles, and document markups may be stored in one or multiple locations. Relations between the document, markup styles, and the markups may be defined in the document itself, within a data structure defining such associations, within a data structure or stored data representative of the markups, and various combinations thereof.

Regardless of where the document, data defining markup styles, and markup data is stored, selection of the SAVE button 110 causes data representative of markups added to or removed from a document presented within the textual presentation area 102 to be stored.

Selection of the PERFORM ACTION(S) button 112 causes one or more actions associated with the markup styles of markups added to the presented document text to be performed. As mentioned above, such actions may include generation of an email or a meeting invitation with marked up text being populated into various email or invitation fields. Generation of an email or an invitation typically includes generation of one or more application programming interface (API) calls to an operating system (OS) of a computing device (i.e., a personal computer, a tablet, a smartphone) on which the user interface 100 is presented or an email or groupware application (i.e., Microsoft® Outlook®) that executes thereon. In another embodiment, such actions may include generation of a new word processing document, such as by generating and submitting one or more API calls to a word processing application executing on the computing device. Such a word processing document will typically be generated with multiple sections where each section is populated with text from markups associated with various markup styles, each markup style having its own section or subsection. Among other benefits, such embodiments allow a document-reviewing user to define a new organization of text provided in a document as the user reviews the document. The effort of reorganizing text in the document is significantly reduced as manual copy and paste operations are not needed, or at least as significantly reduced.

In one embodiment, an algorithm to generate a new document including text marked up for different document sections includes receiving a command to generate a new document based on the markups, such as selection of the PERFORM ACTION(S) button 112. An API call is then issued to a word processing application and the new document is created. The markups may then be evaluated to determine a number of sections to be included in the new document. When only a single section is needed, the marked up text is copied sequentially, unless marked up in a differing order, and pasted into the new document. When the markups dictate multiple sections, an order of the sections is determined. The order may be defined in the markup style definitions. However, where an order is not defined, a user interface may be presented to the user requesting input regarding the ordering of the sections. Once the order of sections is identified, the first section is generated in the new document, such as through an API call to the word processing document, and the text marked up for inclusion in that section is placed therein. The next section is then created and the text placed therein. This process repeats until all needed sections are created. The new document may then be stored, presented to the user, or both. In another embodiment and depending on one or more actions associated with each defined markup style, the new document may be forwarded over a network, such as a local area network or the Internet, to another user or system.

In a further embodiment, the actions associated with the markup styles may be specific to a particular application. For example, where the document to which the markups are applied is a requirements document submitted to a product vendor that offers several products, each markup style may be associated in a respective markup definition with a particular product or product class of the product vendor. The action associated with each markup style may include an action to trigger a process or invoke another application to receive and process the marked up text. That application may then process the marked up text and provide an output to the user, store data such as the text to a database, or forward data such as the text or an output of a process to another system. Through such embodiments, textual data from a marked up document can automatically be processed, extracted and provided to other systems, among other possibilities. Further, efforts of a reviewing user can be leveraged more quickly and accurately by removing an additional error-prone, manual task of inputting such data into another program or system as needed in particular processes.

Regardless of the particular actions to be performed, selection of the PERFORM ACTION(S) 112 button causes the particular actions of the relevant markups to be performed. The actions may be initiated within an application of which the user interface 100 is a part. In other embodiments, when the application of which the user interface 100 is a part does not organically include the text markup functionality, an application plugin augmenting the application will initiate the actions and perform the relevant portions thereof. Initiation and performance of the actions may include calling other processes, services, and the like depending on the particular actions to be performed and configuration of the actions within the markup style definitions.

Figure 2:
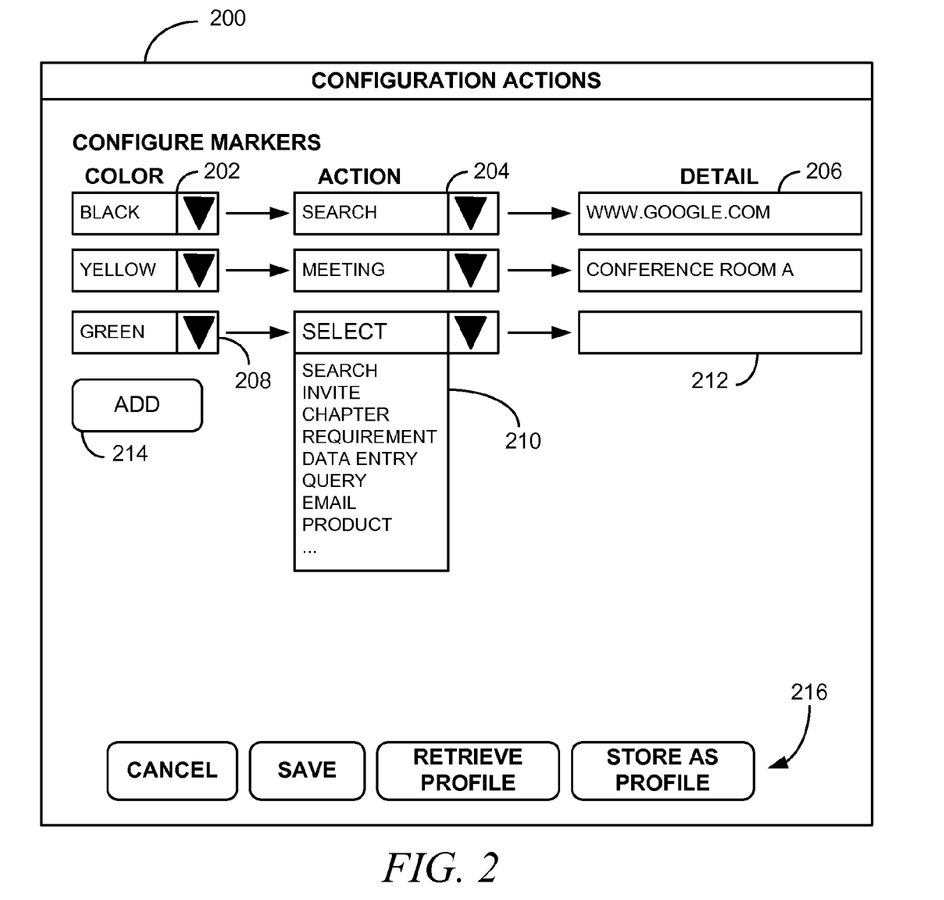
FIG. 2 is a user interface illustration according to an example embodiment.

FIG. 2 is a user interface 200 illustration according to an example embodiment. The user interface 200 is an example of a markup style configuration user interface within which details of markup styles can be viewed, added, edited, and deleted. Further, in the illustrated embodiment, an option to define and store a markup style profile is provided. Such a markup style profile, when created, is a markup style that is stored separately from any particular document so the profile can be used again with other documents. In some embodiments, a markup style profile can also be shared with other users.

The user interface 200 presents markup options and action configuration abilities. While the user interface 200 includes only highlighting color options for defining markup styles, other embodiments may include additional text formatting options for use in defining a markup style. For example, a markup style may be defined with regard to other properties of text, such as being one or more of bold, italic, a particular color, a different font, a different font size, single or double underlined, single or double strikethrough, all capital letters, small capital letters, to include particular sub- or superscript, and relevant combinations thereof. Yet another embodiment provides options for defining markups that are not visible in some or all views of a document, such as when presented within the document presentation area 102 illustrated and described above with regard to FIG. 1.

As illustrated, the user interface 200 includes three columns of options for each markup style. These options include a color used to highlight marked up text, an action to be performed with regard to the marked up text, and a detail option. Data included within the detail option may vary depending on the particular selected action option with regard to a markup style. For example, the detail option when the action option is search may identify a location, service, website, or other entity relevant to the search, such as an Internet search engine or a database to be searched based on marked up text. The detail options in some embodiments may be even further involved. For example, the detail options may include a data element indicating each document portion marked up according to the particular markup style is to be search individually or once utilizing text from each of the document portions marked up according to the defined style.

In a first example markup style is illustrated within the user interface 200, a color of black 202 is specified for the markup style. This markup style includes an action 204 of search and detail 206 of WWW.GOOGLE.COM. This configures the markup styles so that all text marked up according to this markup style is searched via the Google® search engine.

A second example markup style is illustrated within the user interface 200 having a color of yellow. This example is for an action of scheduling a meeting. The detail in this second example specifies a conference room where the meeting is to take place. The detail, in some embodiments for scheduling a meeting may include more dimensions, such as causing a meeting scheduling user interface to be displayed where a meeting room, date, and time can be selected. A further embodiment may instead include additional markup style configurations where other colors are utilized to markup text in documents that will be used to populate further elements of the meeting, such as the location, invitees, date and time, text to be included in a body of an invite and so on.

A third example markup style is illustrated within the user interface 200 having a color of green 208. The color in each of the examples is selectable from a dropdown user interface control. Other control types and other text markup style options may be provided in other embodiments, as previously described. The action 210 options are presented within a dropdown listing. Again, other user interface controls can be utilized in different embodiments and additional and different options may be provided.

The action options presented in the action 204 control of the third example include a search and an invite option, both as previously described. The options also include a chapter option. A chapter option is as discussed above with regard to the section options. In various embodiments, the detail option can be configured so each marked up portion of text will be its own chapter or section in a document to be created based on the marked up text. In some other embodiments, multiple chapter markup styles can be configured where each chapter markup style will be its own chapter in the document to be created. For example, all text of a document marked up as green will be included in one chapter. Another markup style, such as having a red color, can be designated as another chapter. Thus, all green marked up text will be placed in one chapter of the document to be created and all red marked up text will be placed in another chapter.

The actions options as presented in the action control of the third example further include a requirement action. A requirement action can be configured in different ways. In one example, a single requirement action markup style may be defined. A user reviewing a document including customer product or service requirements may then markup document text to identify requirements and details thereof. An action may then be performed against such marked up documents to copy the marked up text therein and repurposed, such as into another document, into a customer relationship management application, or other destination as configured in the detail 212 of the third example. In another embodiment, a requirement markup style may be defined for each of a plurality product or service offerings of a vendor. Text within a document may then be marked up accordingly and multiple documents or a multi-section document, a document or section of a document for each marked up requirement based on the configuration details provided. In another embodiment, one or more other applications may receive the text of the document marked up with a requirement markup style. The one or more other applications, in some embodiments, may process the text according to an algorithm, such as a scoping algorithm, to determine a likely relevance of one or more product or service offerings to the marked up requirement text. Such a product may be a software product, a special purpose machine, a financial services product, a service offering, or other product or service. Data representative of one or more relevance determinations may then be presented to a user, such as in a graphical representation, stored to a customer relationship management application, emailed to one or more users which may include a requesting customer, provided to a product and service proposal generation process or system, among other possibilities. Regardless of the action to be performed, the detail control 212, in some embodiments is utilized to configure the specifics of the particular action to be performed with regard to marked up text. However, in some embodiments, selection of the action may be sufficient and does not require any additional detail input. Further, although only a text box is illustrated for the detail control 212, when additional configuration information is to be provided with regard to not only requirement markup styles but also other markup styles, the detail configuration data may be gathered through other user interface control types, via one or more additional user interfaces, and include one or a plurality of configuration options.

The data entry action 210 option is a markup style that can be used in some embodiments to associate marked up text with particular data fields of forms, database columns, application interfaces, function and service calls, and the like. Multiple data entry action 210 configurations may be included in different embodiments.

The query action 210 option is similar to the search action 210 option, but is typically instead with regard to querying a database, an application, a web service, or other data source capable of querying. A query action 210 option is typically defined to perform a query based on text included in a marked up document. The detail 212 may be populated with connectivity data, database access credentials, and other data that might be needed to facilitate a query.

The email action 210 option is as described above.

The product action 210 is a markup style that can be defined in some embodiments to link a portion of a document, such as a requirement or request for proposal document. The detail 212 may identify one or more products. When the markup style is associated with a portion of document text, the association indicates the product meets or likely meets the particular requirement, at least in part. The action performed against such a document including product markups, in some embodiments, may cause at least a portion of a proposal document to be generated that includes each product associated with text marked up in a document according to a product markup style.

Other embodiments may include additional or different action 210 options and corresponding details 212.

The user interface 200 further includes actions that can be performed with regard to received input. These actions are presented by a set of action buttons 216 that can be selected to carry out the particular action desired. For example, when a user does not desire to save any changes made to the markup styles, a CANCEL button can be selected. To save additions, deletions, and other modifications to markup styles, the SAVE button can be selected. This will cause data representative of the markup style configuration to be stored, such as in a document itself, in a database, within application data, or other storage location.

The user interface 200, in some embodiments, may include markup style configuration profiles. Such profiles are stored representations of markup style configurations that can be stored and retrieved for later use in marking up documents according to the same markup style configuration. For example, if a user or a group of users desires to use the same markup style configuration for multiple documents or consistently within a group of users, a profile may be stored using the STORE AS PROFILE button, which can be later retrieved using the RETRIEVE PROFILE button.

In another embodiment, markup styles may be generated in association with something to be marked up in a document automatically. For example, one or more markup styles may generated and associated with data representative of a product, a document, a profile of a person, data representative of a property, building, or room, or other data. The action of such markup styles is to markup text of a document under review to link portions of the document to the data represented by the markup style based on a matching performed between document text and data associated with the defined markup styles. Such document markup may be performed in an automated manner in such embodiments.

Once the markup style configuration is complete, the user interface 200 may be closed, which will typically return the user to the user interface 100 of FIG. 1. However, in some embodiments, the user interface 200 may be accessed without first viewing the user interface 100.

Figure 3:
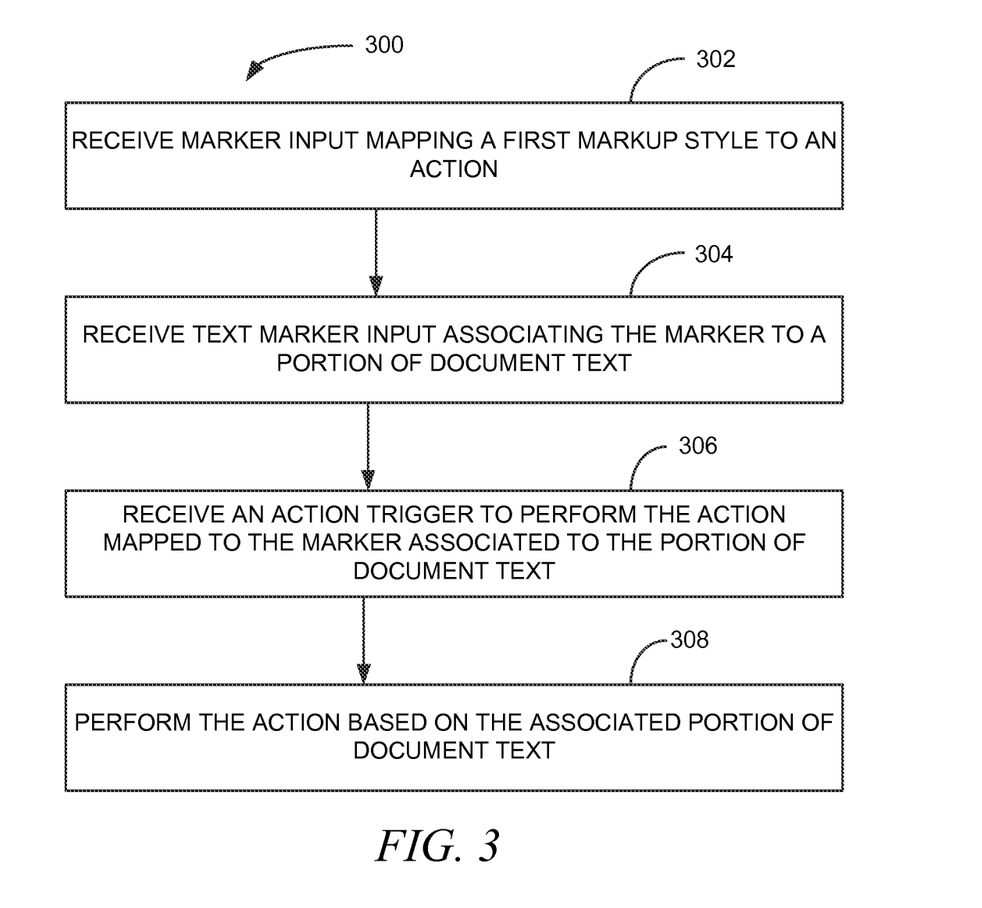
FIG. 3 is a block flow diagram of a method, according to an example embodiment.

FIG. 3 is a block flow diagram of a method 300, according to an example embodiment. The method 300 is an example method of configuring a markup style including an action, marking up a document according to the configured markup style, and performing the action against the marked up portion of the document. The method 300, in the example embodiment, includes receiving 302 marker input mapping a first markup style to an action and receiving 304 text marker input associating the marker to a portion of document text. The method 300 further includes receiving 306 an action trigger to perform the action mapped to the marker associated to the portion of document text and performing 308 the action based on the associated portion of document text.

In some embodiments, the method 300 includes storing a representation of the marker input as a marker profile. In one such embodiment, the method 300 further includes storing data identifying the document of the document portion, an association to the marker profile, and data identifying the portion of document text of the received text marker input. In another embodiment, the action of the action trigger is a query of stored data based at least in part on the portion of document text, the stored data to be queried identified in the marker input.

Some embodiments of the method 300 further include receiving second marker input mapping a second markup style to a second action and receiving second text marker input associating the second marker to a second portion of document text. For example, the first marker input may map a portion of document text to an email address field and the second marker input may map another portion of document text or content to an email body. In such an embodiment, the action trigger will cause an email to be generated and populated with text in accordance therewith.

In another embodiment, receiving 306 the action trigger is a command, according to received 304 text marker input, to split a document into which the text marker input and second text marker input has been received into two documents. For example, a first document of the two documents may be a document consisting of document text associated with a first text marker input, a second document consisting of document text associated with a second text marker input.

Figure 4:
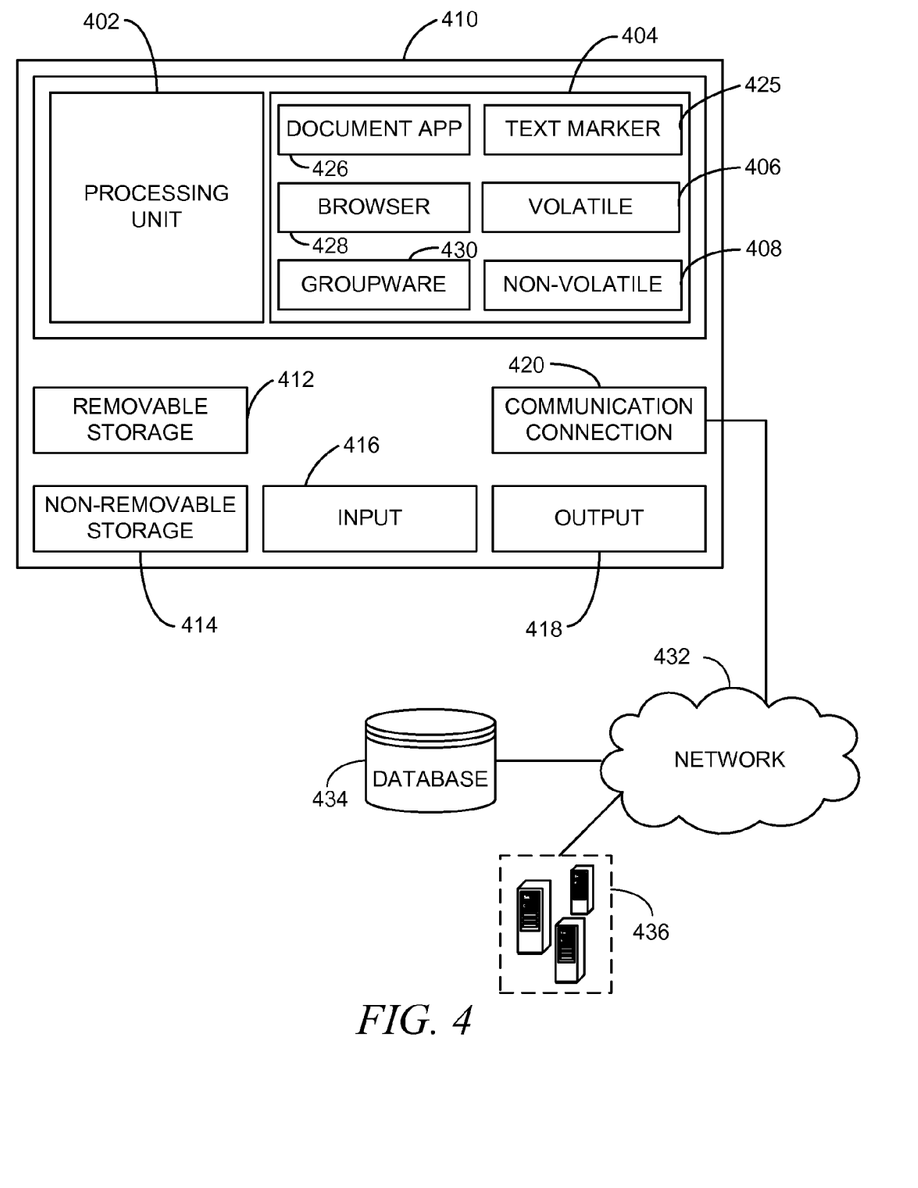
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, or other computing device including the same or similar elements as illustrated and described with regard to FIG. 4. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The computer may operate in a networked environment using a communication connection 420 to connect to one or more remote computers, such as database servers 434, web servers 436, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network 432. The network 432 may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs, such as a text marker program 425 or application plugin, a document authoring or view application 426, a web browser 428, and a groupware application 430 may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving, by a computing device, an option from a user to define a first markup style;
receiving, by the computing device, a first action from the user to associate with the first markup style;
storing, by the computing device, data representative of the first markup style and the action associated with the first markup style;
receiving, by the computing device, text marker input from the user, the text marker input associated with the first markup style and associated with a portion of document text;
receiving, by the computing device, an action trigger to perform the action associated with the first markup style; and
performing, by the computing device, the action based on the associated portion of document text.

2. The method of claim 1, further comprising:
storing the first markup style and associated first action provided by the user as a marker profile.

3. The method of claim 2, further comprising:
storing data identifying a document associated with the portion of document text, an association to the marker profile, and data identifying the portion of document text of the received text marker input.

4. The method of claim 2, wherein the portion of document text is in a first document and the user is a first user, and wherein the marker profile is retrieved by a second user to be used in a second document.

5. The method of claim 1, wherein the action is a query of stored data based at least in part on the portion of document text, the stored data to be queried identified in the text marker input.

6. The method of claim 1, further comprising:
receiving, from the user, an option to define a second markup style;
receiving, from the user, a second action to associate with the second markup style;
receiving second text marker input associated with the first markup style and associated with a second portion of document text; and
wherein the action trigger further causes the second action to be performed based on the second portion of document text.

7. The method of claim 6, wherein:
the action trigger is a command to generate an email based on the text marker input and the second text marker input;
the portion of document text identified by the text marker input is at least one email recipient to which the email generated in response to the trigger input is to be sent; and
the portion of document text identified by the second text marker input identifies content to be included in a body of the email generated in response to the trigger input.

8. The method of claim 6, wherein:
the action trigger is a command to generate a calendaring program invite based on the text marker input and the second text marker input;
the portion of document text identified by the text marker input is at least one email recipient to which the calendaring program invite generated in response to the trigger input is to be sent; and
the portion of document text identified by the second text marker input identifies at least one of a date and time, duration, and content to be included in the calendaring program invite generated in response to the trigger input.

9. The method of claim 6, wherein:
the action trigger is a command to split a document associated with the text marker input and the second text marker input into two documents, a first document of the two documents being a document consisting of document text associated with the text marker input, a second document of the two documents consisting of document text associated with the second text marker input.

10. The method of claim 6, wherein:
the action trigger is a command to split a document associated with the text marker input and the second text marker input into document sections, a first section of the document sections being a document section consisting of document text associated with the text marker input, a second document section of the document sections consisting of document text associated with the second text marker input.

11. The method of claim 1, wherein the action is an association with a product, a representation of which is stored in a repository including metadata descriptive of at least one capability of the product, the method further comprising:
determining a relevance of the product to the portion of document text to which the text marker input is associated; and
presenting a graphical view of the determined relevance of the product to the portion of document text.

12. The method of claim 11, wherein the product is a software product.

13. The method of claim 1, wherein the first markup style comprises at least one of bold, italic, a particular color, a different font, a different font size, single underline, double underline, single strike through, double strike through, all capital letters, small capital letters, subscript, or superscript.

14. The method of claim 1, wherein the portion of document text includes multiple document sections.

15. The method of claim 14, wherein the action trigger is to generate a new document, and wherein the method further comprises:
causing a new document to be created;
determining an order for the multiple document sections to be included in the new document; and
placing the multiple document sections in the new document based on the determined order.

16. The method of claim 1, wherein the portion of document text is in a first document, and wherein the method further comprising:
storing data representative of the first markup style in the first document, a database, or within application data.

17. A non-transitory computer-readable storage medium, with instructions stored thereon, which when executed by at least one processor of a computer, cause the computer to:

receive, an option from a user to define a first markup style;

receive, a first action from the user to associate with the first markup style;

store data representative of the first markup style and the action associated with the first markup style;

receive text marker input from the user, the text marker input associated with the first markup style and associated with a portion of document text;

receive an action trigger to perform the action associated with the first markup style; and perform the action based on the associated portion of document text.

18. The method of claim 17, wherein the action is a query of stored data based at least in part on the portion of document text, the stored data to be queried identified in the text marker input.

19. The method of claim 18, further comprising:

receiving from the user, an option to define a second markup style;

receiving, from the user, a second action to associate with the second markup style;

receiving second text marker input associated with the first markup style and associated with a second portion of document text; and wherein the action trigger further causes the second action to be performed based on the second portion of document text.

20. The method of claim 19, wherein:

the action trigger is a command to generate a new document based on the text marker input and the second text marker input;

the portion of document text identified by the text marker input identifies content to be included as a first portion of the document; and the portion of document text identified by the second text marker input identifies content to be included by the second portion of the document.

21. The method of claim 17, wherein the action is an association with a product, a representation of which is stored in a repository including metadata descriptive of at least one capability of the product, the method further comprising:

determining a relevance of the product to the portion of document text to which the text marker input is associated; and presenting a graphical view of the determined relevancy.

22. A system comprising:

at least one computer processor and at least one memory device;

a document application stored in the at least one memory and executable by the at least one computer processor, the document application including an interface through which at least one of a document application plugin and another application communicate with the document application to obtain data and manipulate documents;

a document application plugin stored in the at least one memory device and executable by the at least one processor, in cooperation with the document application, to:

receive, an option from a user to define a first markup style;

receive, a first action from the user to associate with the first markup style;

store data representative of the first markup style and the action associated with the first markup style;

receive text marker input from the user, the text marker input associated with the first markup style and associated with a portion of document text;

receive an action trigger to perform the action associated with the first markup style; and perform the action based on the associated portion of document text.

23. The system of claim 22, the document application further executable by the at least one processor, in cooperation with the document application, to:

receive from a user, an option to define a second markup style;

receive from the user, a first action to associate with the first markup style;

receive second text marker input associated with the first markup style and associated with a second portion of document text; and wherein the action trigger further causes the second action to be performed based on the second portion of document text.

24. The system of claim 23, wherein:

the document application includes email-authoring functionality;

the action trigger is a command to generate an email based on the text marker input and the second text marker input;

the portion of document text identified by the text marker input is at least one email recipient to which the email generated in response to the trigger input is to be sent; and the portion of document text identified by the second text marker input identifies content to be included in a body of the email generated in response to the trigger input.

25. The system of claim 23, wherein:

the document application includes email-authoring functionality;

the action trigger is a command to split a document associated with the text marker input and the second text marker input into two documents, a first document of the two documents being a document consisting of document text associated with the text marker input, a second document of the two documents consisting of document text associated with the second text marker input.

* * * * *